US010706646B2

(12) United States Patent
Ahn et al.

(10) Patent No.: US 10,706,646 B2
(45) Date of Patent: Jul. 7, 2020

(54) VEHICLE DIAGNOSTIC DEVICE AND METHOD OF MANAGING CERTIFICATE THEREOF

(71) Applicants: Hyundai Motor Company, Seoul (KR); Kia Motors Corporation, Seoul (KR); Hyundai AutoEver Corporation, Seoul (KR)

(72) Inventors: Hyun Soo Ahn, Gyeonggi-do (KR); Ho Jin Jung, Seoul (KR); A Ram Cho, Gyeonggi-do (KR); Jae Woo Im, Seoul (KR)

(73) Assignees: Hyundai Motor Company, Seoul (KR); Kia Motors Corporation, Seoul (KR); Hyundai AutoEver Corporation, Seoul (KR)

( * ) Notice: Subject to any disclaimer, the term of this patent is extended or adjusted under 35 U.S.C. 154(b) by 290 days.

(21) Appl. No.: 15/811,064

(22) Filed: Nov. 13, 2017

(65) Prior Publication Data

US 2018/0151005 A1 May 31, 2018

(30) Foreign Application Priority Data

Nov. 30, 2016 (KR) ........................ 10-2016-0161946

(51) Int. Cl.
*G06F 7/00* (2006.01)
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC ......... G07C 5/0808; G07C 5/008; G07C 5/00
USPC .................. 701/31.4, 31.5, 1; 455/410, 420; 707/705
See application file for complete search history.

(56) References Cited

U.S. PATENT DOCUMENTS

2004/0185842 A1* 9/2004 Spaur ...................... B60R 25/04 455/420
2012/0215754 A1* 8/2012 Marzani ................ F02D 41/266 707/705
2015/0000589 A1* 1/2015 Nieten ................... G01N 21/29 116/201
2015/0100197 A1* 4/2015 Peirce ................... H04W 12/08 701/31.5

FOREIGN PATENT DOCUMENTS

KR 10-0501172 7/2005
KR 10-1216110 B1 12/2012
KR 10-1509866 4/2015
KR 10-1529968 6/2015
WO 2008/013655 A2 1/2008

* cited by examiner

*Primary Examiner* — Shardul D Patel
(74) *Attorney, Agent, or Firm* — Mintz Levin Cohn Ferris Glovsky and Popeo, P.C.; Peter F. Corless

(57) ABSTRACT

A method of performing diagnostic communication with a vehicle using a diagnostic device includes: acquiring a certificate revocation list (CRL) corresponding to a certificate of the diagnostic device from an external device, verifying a validity of the certificate using the acquired CRL, performing authentication with the vehicle when the validity of the certificate is verified, and starting diagnostic communication between the diagnostic device and the vehicle when the authentication is performed.

19 Claims, 5 Drawing Sheets

VEHICLE DIAGNOSTIC DEVICE AND METHOD OF MANAGING CERTIFICATE THEREOF

CROSS-REFERENCE TO RELATED APPLICATION

This application claims the benefit of priority to Korean Patent Application No. 10-2016-0161946, filed on Nov. 30, 2016, which is hereby incorporated by reference as if fully set forth herein.

BACKGROUND OF THE DISCLOSURE

Technical Field

The present disclosure relates to a method of reliably managing a certificate and, more particularly, to a vehicle diagnostic device performing a method of reliably verifying whether a certificate thereof is valid.

Discussion of the Related Art

On-board diagnostics (OBD) refers to a vehicle's self-diagnostic and reporting capability. Vehicles produced recently include sensors, which are controlled by an electronic control unit (ECU), for a variety of measurement and control. An original object of the ECU was to control core functions of an engine, such as ignition timing and fuel injection, variable valve timings, idling, limit value setting, etc. However, with the integration of vehicles and computers, the ECU is now responsible for controlling virtually all components of the vehicle such as the driving system, braking system, steering system, etc.

In addition, an electronic diagnostic system has been developed in response to increased vehicle electrification. Recently, a standardized diagnostic system known as on-board diagnostics version II (OBD-II) has been established. In order to prevent uncertificated access to recently released vehicles through OBD-II connection, a certificate giving access rights is issued with respect to a diagnostic device such that only a certificated diagnostic device can access the vehicle.

When such a certificate is no longer valid, e.g., due to change in a relation among a certificate authority, among a vehicle manufacturer and a diagnostic device manufacturer, or a technical change, the certificate is revoked. The revoked certificate is then managed in the form of a certificate revocation list (CRL) that is delivered to a vehicle. Accordingly, the vehicle acquires the CRL and verifies whether the certificate of the diagnostic device is revoked.

However, in a vehicle environment in which no wireless connection for acquisition of the CRL is available (that is, the vehicle is offline), it is difficult for the vehicle to determine whether the certificate is revoked. For example, even when the CRL is transmitted to the vehicle through the diagnostic device, it is difficult to verify, store, and update the CRL in a gateway or an ECU having inferior computing performance and an insufficient storage space.

Accordingly, there is a need for a method of reliably verifying the validity of a certificate of a diagnostic device for a vehicle having inferior calculation/storage capacity or a vehicle in an offline mode.

SUMMARY OF THE DISCLOSURE

Accordingly, the present disclosure is directed to a vehicle diagnostic device and a method of managing a certificate thereof that substantially obviate one or more problems due to limitations and disadvantages of the related art.

An object of the present disclosure is to provide a method of reliably verifying the validity of a certificate of a diagnostic device, and a device therefor, particularly in cases of an offline vehicle or a vehicle having a low-performance controller mounted therein, and a device therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the disclosure, a method of performing diagnostic communication with a vehicle using a diagnostic device includes: acquiring a certificate revocation list (CRL) corresponding to a certificate of the diagnostic device from an external device, verifying a validity of the certificate using the acquired CRL, performing authentication with the vehicle when the validity of the certificate is verified, and starting diagnostic communication between the diagnostic device and the vehicle when the authentication is performed.

Furthermore, according to embodiments of the present disclosure, a diagnostic device for performing diagnostic communication with a vehicle includes: a memory storing a certificate of the diagnostic device; a communication unit acquiring a certificate revocation list (CRL) corresponding to the certificate from an external device; a vehicle connector performing communication with the vehicle; and a processor verifying a validity of the certificate using the acquired CRL, performing authentication with the vehicle through the vehicle connector when the validity of the certificate is verified, and starting diagnostic communication between the diagnostic device and the vehicle when the authentication is performed.

The effects obtained by the present disclosure are not limited to the above-described effects and the other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
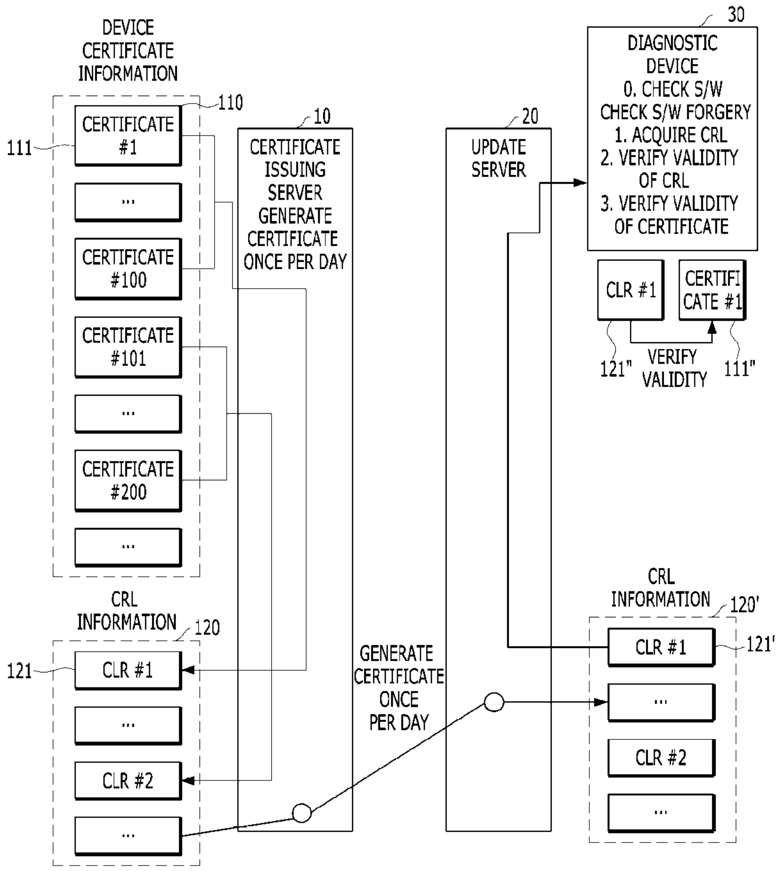
FIG. 1 is a diagram showing an example of the structure of a certificate management system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

Throughout the specification, when a certain portion "includes" a certain component, this indicates that the other components are not excluded, but may be further included unless specially described. The same reference numbers will be used throughout the drawings to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, in an offline environment or in an environment of a vehicle having a controller which cannot verify or store a certificate revocation list (CRL), a vehicle does not acquire and verify the CRL with respect to a diagnostic device and instead the diagnostic device acquires the CRL and verifies validity of a certificate thereof.

First, a process of generating and delivering a CRL to a diagnostic device will be described with reference to FIG. 1.

FIG. 1 is a diagram showing an example of the structure of a certificate management system according to embodiments of the present disclosure.

As shown in FIG. 1, the certificate management system according to the present disclosure may include a certificate issuing server 10, an update server 20 and a diagnostic device 30. The servers and the diagnostic device may be connected by wire or wirelessly, although the present disclosure is not limited to any one connection method.

Hereinafter, components will be described in detail.

First, the certificate issuing server 10 generates vehicle-dedicated CRL information 120 corresponding to certificate information 110 of a plurality of diagnostic devices according to a predetermined generation rule and delivers the CRL information to the update server 20. According to the generation rule, a maximum number of pieces of diagnostic-device certificate information which may be included in one CRL, a generation (or update period) of the CRL, a period for delivering a generated (or updated) CRL to the update server, etc., may be defined. A relation between the certificate information 110 and the CRL information 120 will be described in greater detail with reference to FIG. 3.

The update server 20 is responsible for managing the CRL information 120' received from the certificate issuing server 10 and delivering a CRL 121" corresponding to a certificate 111" of the diagnostic device 30 when the diagnostic device 30 requests the CRL or at a predetermined period.

The diagnostic device 30 acquires the CRL 121" corresponding to the certificate 111" of the diagnostic device 30, verifies validity of the certificate and performs vehicle diagnosis only when the certificate is valid.

For example, when certificate #1 111 is revoked in device certificate information 110 of the certificate issuing server 10, the certificate issuing server 10 writes information on certificate #1 111 in CRL #1 121 corresponding to certificate #1 111 in the CRL information 120.

The CRL information 120 including CRL #1 121 in which the information on the certificate #1 is written is delivered from the certificate issuing server 10 to the update server 20 (120'). Thereafter, when the diagnostic device 30 requests a CRL corresponding to certificate #1 111" of the diagnostic device 30 for vehicle diagnosis, the update server 20 provides CRL #1 121' managed by the update server 20 to the diagnostic device 30. The diagnostic device 30 verifies validity of CRL #1 121" acquired by the diagnostic device 30 and verifies validity of certificate #1 111" of the diagnostic device 30 using CRL #1 121" upon determining that CRL #1 121" is valid.

As a result of verification, CRL #1 indicates that certificate #1 is revoked. Therefore, the diagnosis device 30 does not perform vehicle diagnosis.

Figure 2:
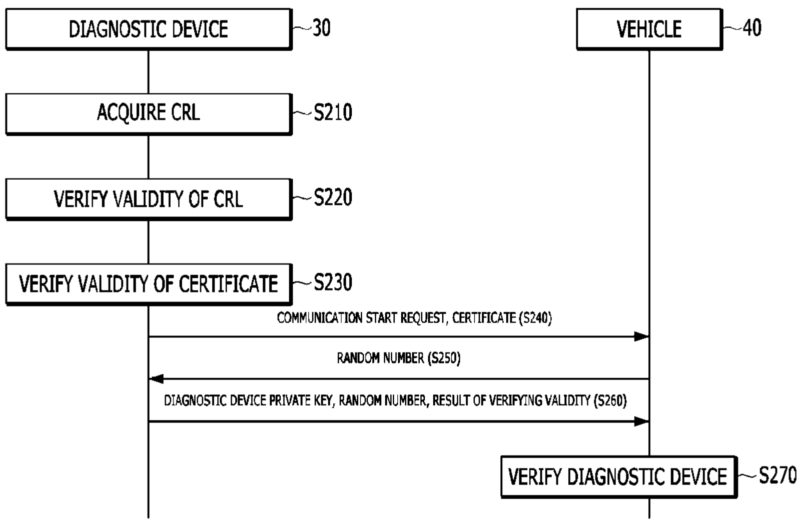
FIG. 2 is a flowchart illustrating an example of a diagnostic-device authentication procedure performed between a diagnostic device and a vehicle according to embodiments of the present disclosure.

Next, communication between the diagnostic device and the vehicle will be described with reference to FIG. 2. FIG. 2 is a flowchart illustrating an example of a diagnostic-device authentication procedure performed between a diagnostic device and a vehicle according to embodiments of the present disclosure.

As shown in FIG. 2, the diagnostic device 30 acquires the CRL corresponding to the certificate of the diagnostic device 30 from the update server 20 (S210) in order to perform vehicle diagnosis, and verifies validity of the CRL (S220). The method of verifying validity of the CRL may be performed by determining the expiration period and issuer of the CRL or may be performed using an additional verification method. For example, the validity verification method may be performed through a symmetrical/asymmetrical key authentication procedure with the update server 20, through the certificate of the CRL or using an integrity checking method such as CRC. Of course, such a validity verification method is exemplary, and the embodiments of the present disclosure are not limited by any one particular validity verification method.

When the validity of the CRL is verified, the diagnostic device 30 determines information related to the certificate of the diagnostic device 30 (that is, the CRL) and verifies validity of the certificate (S230).

When the certificate is valid, the diagnostic device 30 transmits the certificate thereof (S240) to the vehicle 40, along with a request for starting communication (e.g., according to OBD-II protocol).

The vehicle 40, which has acquired the certificate of the diagnostic device 30, transmits a random number to the diagnostic device 30 (S250).

The diagnostic device 30, which has received the random number, encrypts the random number using a private key of the diagnostic device and transmits the encrypted random number to the vehicle 40 along with a result of verifying validity (S260).

The vehicle 40 decodes the random number encrypted for determining the owner of the certificate and preventing reuse attack with a public key of the diagnostic device included in the certificate and verifies authenticity of the certificate (S270). In addition, the vehicle 40 compares the result of verifying validity thereof with the result of verifying validity received from the diagnostic device 30.

When the above-described procedure is successfully performed, the diagnostic device 30 and the vehicle 40 may perform normal diagnostic communication.

Next, a relation between a CRL and a certificate will be described with reference to FIG. 3.

Figure 3:
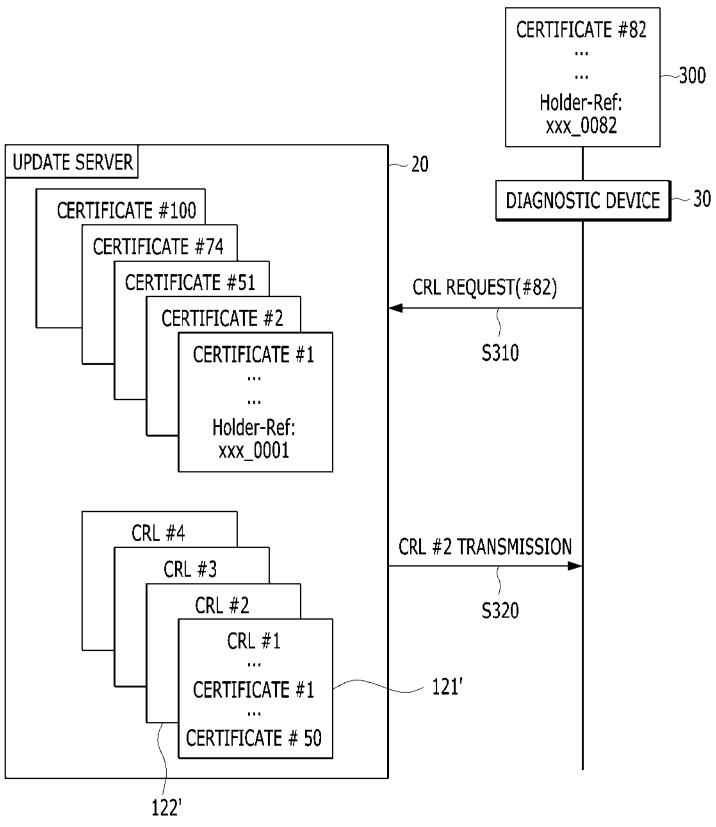
FIG. 3 is a diagram showing an example of a certificate revocation list (CRL) management form and a process of acquiring a CRL in a diagnostic device.

FIG. 3 is a diagram showing an example of a certificate revocation list (CRL) management form and a process of acquiring a CRL in a diagnostic device.

In FIG. 3, it may be assumed that the diagnostic device 30 has a certificate 300 corresponding to an identification number 82, the update server 20 manages a plurality of CRLs, and one CRL includes information on a maximum of 50 revoked certificates.

For example, CRL #1 121' may include revoked certificates having identification numbers 1 to 50 and CRL #2 122" may include revoked certificates having identification numbers 51 to 100.

The number of revoked certificates per CRL may be set for the following reasons.

Since idle RAM of a general diagnostic device has a capacity less than 10 kb, the size of the CRL may be set to less than 1 k, for optimal operation. Accordingly, the size of the CRL may be set to less than 800 bytes. At this time, the CRL may include 50 revoked certificates. Of course, the maximum size of the CRL, the number of revoked certificates per CRL, etc. are but examples and are not limited thereto.

Referring to FIG. 3, the diagnostic device 30 may request the CRL from the update server 20 (S310) in order to verify validity of the certificate to perform vehicle diagnosis. At this time, the diagnostic device may also transmit the identification number #82 of the certificate thereof.

Since the information on the identification number 82 is included in CRL #2 122', the update server 20 may transmit CRL #2 122' to the diagnostic device (S320).

Meanwhile, according to embodiments of the present disclosure, the diagnostic device 30 determines validity of the certificate thereof through the CRL to determine whether vehicle diagnosis is performed. Accordingly, when a user of the diagnostic device modifies (e.g., hacks) an operation logic of the diagnostic device to skip verification of validity of the certificate using the CRL, even when the certificate is revoked, since only integrity verification of the certificate may be performed in the vehicle in the case in which the vehicle does not perform verification using the CRL, the diagnostic device may perform vehicle diagnosis using the revoked certificate. Therefore, verification of validity of the certificate can be prevented from being omitted using a Canary method, which will be described with reference to FIG. 4.

Figure 4:
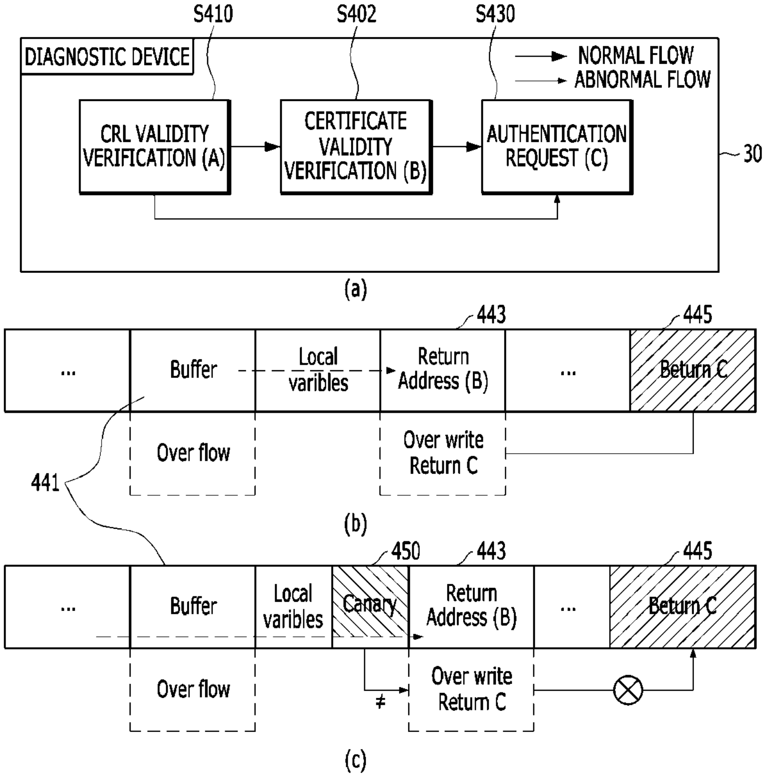
FIG. 4 is a diagram illustrating a buffer overflow attack and a Canary method for preventing the same according to embodiments of the present disclosure.

FIG. 4 is a diagram illustrating a buffer overflow attack and a Canary method for preventing the same according to embodiments of the present disclosure.

First, referring to (a) of FIG. 4, the diagnostic device 30 acquires a CRL, verifies validity of the CRL (S410), before performing vehicle diagnosis, and verifies validity of a certificate, that is, whether a certificate thereof is included in the CRL, using the CRL if the CRL is valid (S420). If the certificate is not revoked and is valid, the diagnostic device requests authentication from the vehicle (S430) in order to perform diagnostic communication with the vehicle.

Here, assume that a function for verifying validity of the CRL is (A), a function for verifying validity of the certificate is (B) and a function for requesting authentication is (C). As shown in (b) of FIG. 4, if a memory region, in which an address for generating overflow in a buffer 441 to call the function (B) is written, is overwritten with an address for calling the function (C), authentication may be immediately requested without the process of verifying validity of the certificate.

In order to prevent such a problem, in the present embodiment, when a specific value is modulated upon function entry, a logic for enabling function calling to fail upon movement of a return address is applied. For example, as shown in (c) of FIG. 4, a specific value called Canary 450 may be used and written in a stack along with a return address 443 upon function entry. In this case, when Canary 450 is modulated upon movement of the return address 443, function calling fails. Here, the Canary may be generated by an operating system (OS) before main( ) upon executing a program and may have the following configuration.

Canary=XOR Random+Terminator

Here, XOR Random is a value obtained by performing XOR operation of a random value and an address addr and may not be estimated by an attractor. In addition, Terminator is a combination of CR, RF, Null and −1 and may not be overwritten.

In summary, in this stack buffer overflow prevention method, a selected small random integer is placed before a stack return point upon starting a program. Buffer overflow generally overwrites a memory address from a low location to a high location and thus the Canary needs to be overwritten in order to overwrite the return pointer. This value verifies whether a routine is changed before using the return address of the stack.

As a result, since verification using the CRL of the certificate of the diagnostic device cannot be skipped according to the above-described method, it is possible to solve a security problem caused when the diagnostic device verifies the certificate thereof.

Next, the structure of a diagnostic device applicable to the embodiments of the present disclosure will be described.

Figure 5:
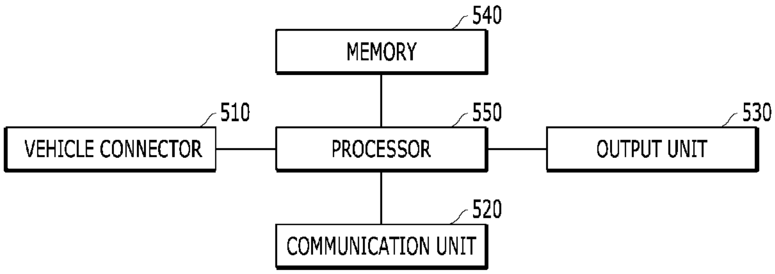
FIG. 5 is a diagram showing an example of the structure of a diagnostic device according to embodiments of the present disclosure.

FIG. 5 is a diagram showing an example of the structure of a diagnostic device according to the present disclosure.

As shown in FIG. 5, the diagnostic device according to embodiments of the present disclosure may include a vehicle connector 510 for connecting the diagnostic device to the vehicle through an OBD-II terminal, a communication unit 520 connected to an external object (e.g., the update server) excluding the vehicle by wire or wirelessly to perform data exchange, an output unit 530 for visibly or audibly outputting vehicle diagnostic information or operation state information of the diagnostic device, a memory 540 for storing an OS, a diagnostic program, a certificate, a CRL, etc. and a processor (that is, microcomputer) 550 for performing control and operation according to software stored in the memory 540.

That is, in the above-described process, request and acquisition of the CRL may be performed under control of the processor 550 and a process of performing communication with the vehicle may be performed through the vehicle connector 510 under control of the processor 550. For example, the processor 550 may interpret a message received through the vehicle connector 510, perform an operation (e.g., encryption, decoding, signature, MAC generation, etc.) corresponding to the message, generate a message corresponding to the result (capable of including and transmitting data acquired according to the result), and transmit the message through the vehicle connector 510.

According to embodiments of the present disclosure, it is possible to more reliably verify validity of a certificate of a diagnostic device.

In particular, the diagnostic device acquires a CRL to verify the certificate of the diagnostic device. Since a verification process is prevented from being skipped, the diagnostic device can reliably verify the certificate thereof even in an environment in which a vehicle is in an offline state.

The above embodiments are therefore to be construed in all aspects as illustrative and not restrictive. The scope of the disclosure should be determined by the appended claims and their equivalents, not solely by the above description, and all changes coming within the meaning and equivalency range of the appended claims are intended to be embraced therein.

What is claimed is:

1. A method of performing diagnostic communication with a vehicle using a diagnostic device, the method comprising:

acquiring a certificate revocation list (CRL) corresponding to a certificate of the diagnostic device from an external device;

verifying a validity of the certificate using the acquired CRL;

performing authentication with the vehicle when the validity of the certificate is verified; and starting diagnostic communication between the diagnostic device and the vehicle when the authentication is performed, wherein, when the CRL is not verified by the vehicle, the diagnostic device acquires the CRL and verifies validity of the certificate thereof.

2. The method according to claim 1, further comprising verifying a validity of the CRL.

3. The method according to claim 2, wherein the verifying of the validity of the CRL comprises determining an expiration period and an issuer of the CRL.

4. The method according to claim 1, further comprising requesting the CRL from a first server.

5. The method according to claim 4, wherein the requesting of the CRL comprises transmitting an identification number of the certificate to the first server.

6. The method according to claim 5, wherein the CRL is prepared by the first server to include a plurality of identification numbers.

7. The method according to claim 6, wherein the acquiring of the CRL comprises receiving the CRL corresponding to an identification number group including the identification number of the certificate from the first server.

8. The method according to claim 1, wherein the verifying of the validity of the certificate comprises writing random data in a memory stack before a stack return pointer.

9. The method according to claim 8, wherein the random data includes i) a first value obtained by an XOR operation of a random value and an address and ii) a second value including a terminator incapable of being overwritten.

10. A non-transitory computer-readable recording medium having a program recorded thereon for executing the method according to claim 1.

11. A diagnostic device for performing diagnostic communication with a vehicle, the diagnostic device comprising:

a memory storing a certificate of the diagnostic device;

a communication unit acquiring a certificate revocation list (CRL) corresponding to the certificate from an external device;

a vehicle connector performing communication with the vehicle; and a processor verifying a validity of the certificate using the acquired CRL, performing authentication with the vehicle through the vehicle connector when the validity of the certificate is verified, and starting diagnostic communication between the diagnostic device and the vehicle when the authentication is performed, wherein, when the CRL is not verified by the vehicle, the diagnostic device acquires the CRL and verifies validity of the certificate thereof.

12. The diagnostic device according to claim 11, wherein the processor verifies the validity of the CRL.

13. The diagnostic device according to claim 11, wherein the processor verifies the validity of the CRL by determining an expiration period and an issuer of the CRL.

14. The diagnostic device according to claim 11, wherein the processor controls the communication unit so as to request the CRL from a first server.

15. The diagnostic device according to claim 14, wherein the processor controls the communication unit so as to transmit an identification number of the certificate to the first server upon requesting the CRL.

16. The diagnostic device according to claim 15, wherein the CRL is prepared by the first server to include a plurality of identification numbers.

17. The diagnostic device according to claim 16, wherein the acquired CRL corresponds to an identification number group including the identification number of the certificate.

18. The diagnostic device according to claim 11, wherein the processor verifies the validity of the certificate by writing random data in a memory stack before a stack return pointer.

19. The diagnostic device according to claim 18, wherein the random data includes i) a first value obtained by an XOR operation of a random value and an address and ii) a second value including a terminator incapable of being overwritten.

* * * * *